United States Patent [19]

Hosoya

[11] Patent Number: 4,821,251

[45] Date of Patent: Apr. 11, 1989

[54] METHOD AND APPARATUS FOR RECORDING OR REPRODUCING INFORMATION IN OR FROM ONLY A SECTOR OF AN OPTICAL DISK TRACK WITHOUT ANY DEFECT BY SHIFTING A LIGHT BEAM TO AN ADJACENT TRACK BEFORE A DEFECTIVE SECTOR

[75] Inventor: Hideki Hosoya, Yokohama, Japan

[73] Assignee: Canon Kabushiki Kaisha, Tokyo, Japan

[21] Appl. No.: 670,880

[22] Filed: Nov. 13, 1984

[30] Foreign Application Priority Data

Nov. 18, 1983 [JP] Japan ................. 58-216052

[51] Int. Cl.⁴ ............................................. G11B 7/09
[52] U.S. Cl. ...................................... 369/44; 369/54; 369/58; 369/111
[58] Field of Search ............... 360/25, 27, 31, 55, 360/60; 369/31, 32, 44, 46, 53, 54, 58; 371/10

[56] References Cited

U.S. PATENT DOCUMENTS

| Re. 31,069 | 10/1982 | Chang et al. ............... 371/10 |
| 4,145,758 | 3/1979 | Drexler et al. ............ 369/54 |
| 4,214,280 | 7/1980 | Halfhill et al. ............ 360/60 |
| 4,546,462 | 10/1985 | Koishi et al. ............. 369/46 |
| 4,571,716 | 2/1986 | Szerlip ...................... 369/54 |
| 4,623,993 | 11/1986 | Schlosser .................. 369/44 |
| 4,701,897 | 10/1987 | Nakagawa .................. 369/44 |

FOREIGN PATENT DOCUMENTS

| 81184 | 6/1983 | European Pat. Off. . |
| 55-113137 | 9/1980 | Japan ..................... 369/54 |
| 58-3103 | 1/1983 | Japan ..................... 360/55 |

Primary Examiner—Alan Faber
Assistant Examiner—James E. Tomassini
Attorney, Agent, or Firm—Fitzpatrick, Cella, Harper & Scinto

[57] ABSTRACT

An apparatus for recording or reproducing information in or from an optical disc, has a semiconductor laser system, a split photosensor, a signal processing circuit, and a disc controller with a CPU and a memory. Defective sectors of the optical disc are detected, and information recording/reproduction is performed for only nondefective sectors.

9 Claims, 6 Drawing Sheets

METHOD AND APPARATUS FOR RECORDING OR REPRODUCING INFORMATION IN OR FROM ONLY A SECTOR OF AN OPTICAL DISK TRACK WITHOUT ANY DEFECT BY SHIFTING A LIGHT BEAM TO AN ADJACENT TRACK BEFORE A DEFECTIVE SECTOR

BACKGROUND OF THE INVENTION

1. Field of the Invention

The present invention relates to a method and an apparatus for recording or reproducing information in or from an optical disc and, more particularly, to a method and an apparatus for recording or reproducing information in or from an optical disc upon irradiation with a light beam, the optical disc having a recording surface with respective tracks divided into a plurality of sectors.

2. Description of the Prior Art

In a conventional method of recording/reproducing information in/from an optical disc, a laser beam is focused to form a small spot with a diameter of about 1 μm on the rotating optical disk having a recording surface formed of photosensitive recording medium. Information signals are recorded in the recording surface at a high density in accordance with formation of grooves/projections, formation of pits, changes in reflectivity, and magnetization directions. The recorded information is reproduced as needed.

Optical disc reproduction apparatuses are exemplified by optical video disc players or digital audio disc (DAD) players. Optical disc recording/reproduction apparatuses are exemplified by so-called optical disc filing systems and the like. The recording signals include a picture signal, an acoustical signal, a digital signal and the like.

In an apparatus of this type, guide tracks are formed at a narrow pitch on the disc to allow optical detection of the tracks and high-density recording. The guide tracks are subjected to tracking servo control, so that information signal recording or information signal reproduction can be performed along or on the guide tracks.

The guide track is selected in accordance with the content of recording information and the type of signal to be recorded. The guide tracks are formed in a spiral or concentric manner with respect to the center of the disc. When the information has an analog form, the information can be generally controlled in units of tracks. On the other hand, when the information has a digital form and the length of data is not determined as in a video signal, information cannot be controlled in units of tracks. The tracks are often divided into sectors such as information blocks, so that information is controlled in accordance with the track and sector address data.

The guide tracks are generally formed in grooves and at the same time the track and sector addresses are formed of three-dimensional phase grooves. Another method is proposed wherein a refractive index of a photosensitive recording material constituting a flat recording surface is changed by using a high power light source prior to recording, and the guide tracks and track and sector address portions are formed in accordance with a change in reflectivity.

When a defect is present in a disc, an accurate tracking error signal cannot be obtained when the guide track is subjected to tracking servo control so as to perform recording/reproduction with respect to a single track. In this case, a track jump (i.e., an erroneous recording or reproduction is performed with respect to the guide track) occurs.

Conventionally in order to prevent such a track jump, a light spot which is about to scan the defective track is detected to generate a detection signal. A tracking error signal and a sample-held or sampled and held signal of a tracking error signal obtained immediately prior to scanning of the defective portion are switched in accordance with the detection signal, thereby driving a tracking actuator. This conventional method will be described in detail with reference to FIG. 1.

Referring to FIG. 1, a contact a of an analog switch 2 is set in a state shown in FIG. 1, and an output (i.e., a tracking error signal $e_N$) from a tracking error detecting circuit 1 is supplied to a driver 3 through the analog switch 2. The tracking error signal $e_N$ is amplified by the driver 3 to a proper level, thereby driving a tracking actuator 4. The tracking error signal $e_N$ is always sample-held by a sample and hold circuit 5 at a proper timing. A sample-held tracking error signal $e_A$ from the sample and hold circuit 5 is connected to a contact b of the analog switch 2.

When a defect of the disc is detected by a defect detecting circuit 6, a switching signal $S_C$ is generated from the defect detecting circuit 6, and the analog switch 2 is switched from the contact a position to the contact b position. The sample-held tracking error signal $e_A$ thus drives the tracking actuator 4. At the same time, the switching signal $S_C$ is also supplied to the sample and hold circuit 5, so that the sample-hold operation is inhibited. The sampled tracking error signal immediately before the light spot reaches the defective portion is held while the light spot passes through the defective portion.

The defect detecting circuit 6 utilized the fact that an amount of light reflected by or transmitted through the disc in the presence of a defect greatly changes as compared with the case in the absence of a defect. The defect detecting circuit 6 generates the switching signal $S_C$ in accordance with the duration corresponding to the presence of the defect and its light amount level.

However, according to the conventional recording or reproduction method described with reference to FIG. 1, when a large eccentric state occurs in a disc while the actuator is driven in response to the sample-held tracking error signal, an objective lens is not held at a predetermined position along the radial direction of the disc, so proper tracking servo control is not performed. As a result, even after the light spot passes through the defective portion and the proper tracking signal is obtained, the tracking control does not start from the same track prior to defective portion scanning. In other words, a track jump occurs, resulting in inconvenience.

SUMMARY OF THE INVENTION

It is an objective of the present invention to provide a method and an apparatus for properly recording or reproducing information in or from an optical disc without a track jump even if a defect is present in the disc.

In order to achieve the above objective, all defective sectors in the disc are detected prior to recording or reproduction, and sectors free from defects are subjected to recording or reproduction in accordance with the detected defective sector information.

DETAILED DESCRIPTION OF THE PREFERRED EMBODIMENTS

Figure 1:
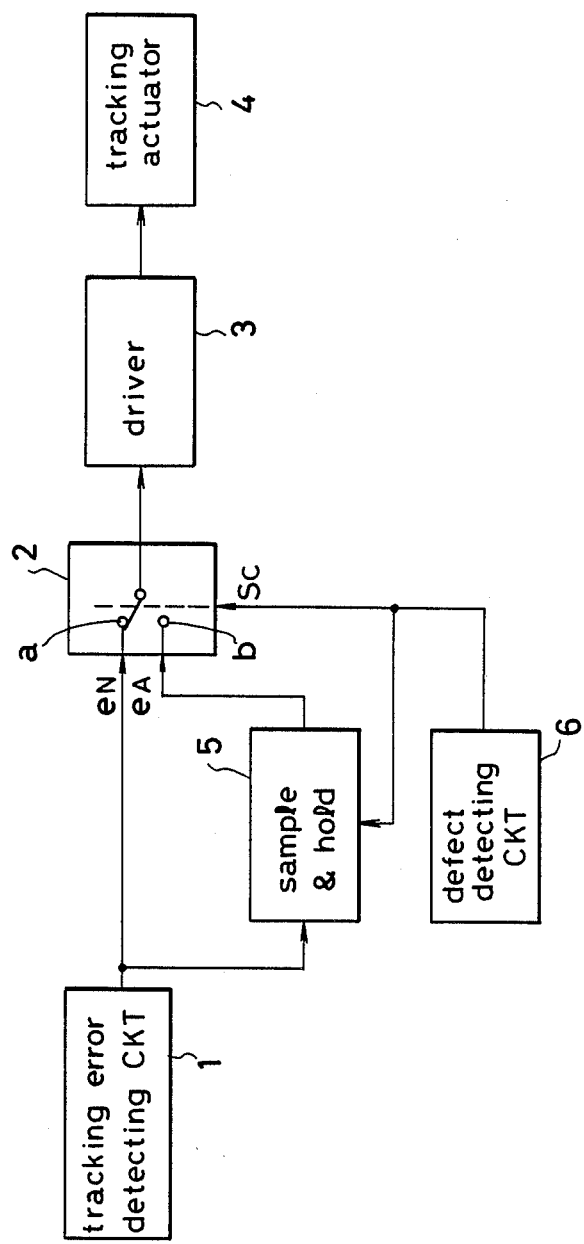
FIG. 1 is a block diagram for explaining prevention of a track jump in a conventional optical disc recording/reproduction apparatus.
Figure 2:
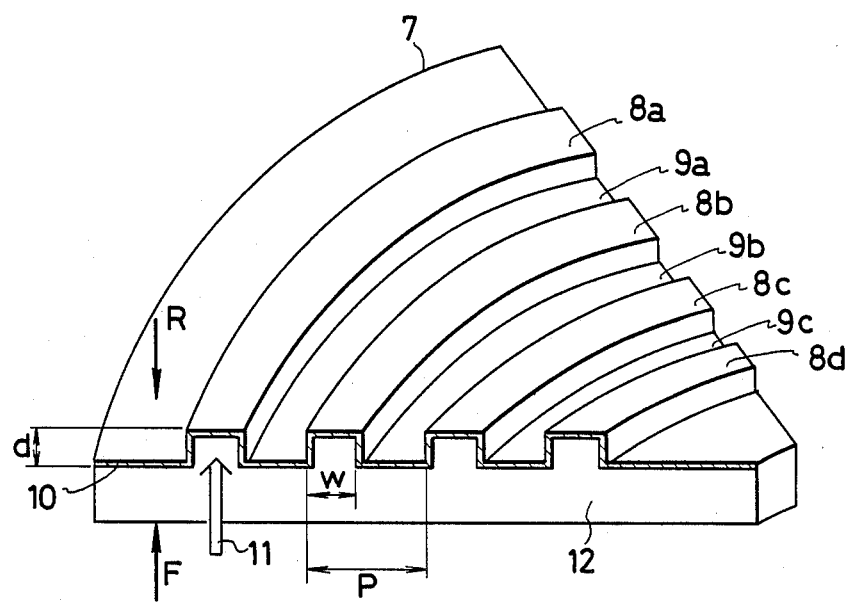
FIG. 2 is a partial perspective view showing a section of an optical disc used in the present invention.

FIG. 2 is a partial perspective view of an optical disc having guide tracks (pregrooves) and to be used in the present invention. Referring to FIG. 2, grooves each having a width W, a pitch p and a depth d are formed on a surface R of an optical disc 7 to constitute concentric guide tracks 8a to 8d. Flat portions 9a to 9c are formed to separate every two adjacent guide tracks. A recording layer 10 is formed by deposition or the like on the surface R of the optical disc 7 which has the guide tracks and the flat portions. A very small light spot 11 irradiates the surface (i.e., the lower surface of the optical disc 7) of a substrate 12. The light spot 11 is formed on the surface R, and information is recorded or reproduced. The guide tracks 8a to 8d are formed under the conditions wherein the pitch p between every two adjacent tracks is 1.6 to 2.0 μm, track width W is 0.8 to 1.0 μm, and the track depth d is about 1/5 to ⅛ of the wavelength of the irradiation beam.

Figure 3:
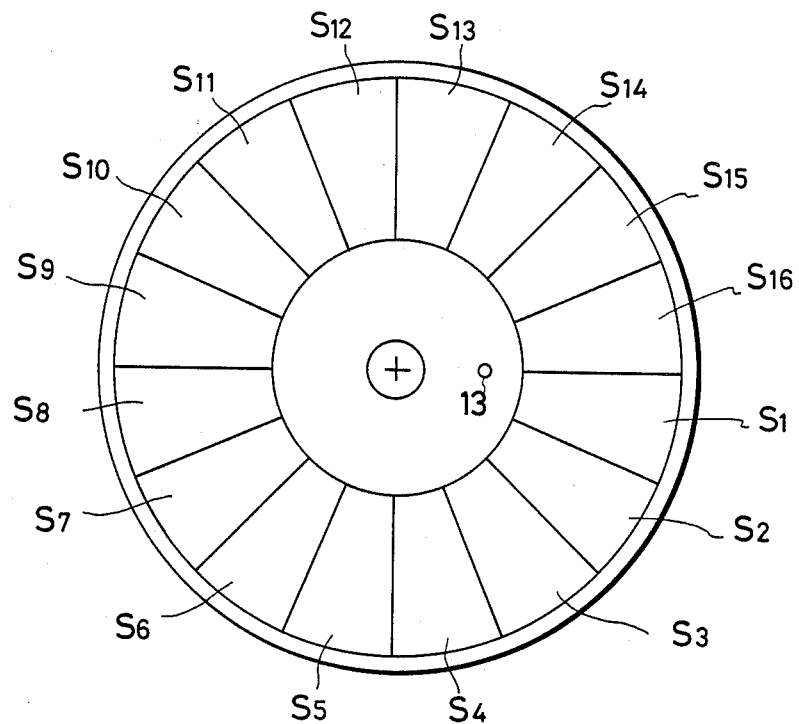
FIG. 3 is a plan view of an optical disc having a sector structure.

FIG. 3 is a plan view of the optical disc having a recording surface obtained by dividing the tracks into a plurality of sectors, i.e., having a sector structure.

Referring to FIG. 3, the tracks are radially divided into a plurality of sectors S1 to S16. These sectors constitute a recording information format to be described later. A reference mark 13 is formed on the optical disc to detect a start position of a first sector S1.

Figure 4:
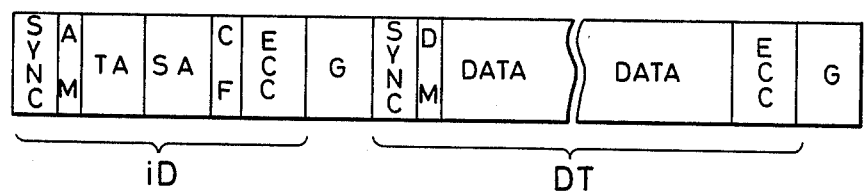
FIG. 4 is a information format of recorded information on an optical disc.

FIG. 4 is a data format of a recording information format of a single track on the optical disc, i.e., one-record information format.

Referring to FIG. 4, the recording information format comprises an index portion iD, a gap portion G, and a data portion DT. The index portion iD comprises synchronizing data SYNC, an address mark AM indicating that the address data follows, a track address TA, a sector address SA, a condition flag CF representing the presence/absence of a defect, and an error correction code ECC. The data portion DT comprises synchronizing data SYNC, a data mark DM representing that data follows, and an error correction code ECC. Among these respective recording divisions, the synchronizing data SYNC, the track address TA and the sector address SA are simultaneously formed as three-dimensional phase grooves when guide tracks are formed. The track address TA has the same number for each concentric track in an order from an inner track to an outer track. The sector address SA is incremented from a first sector S1 located at a position corresponding to the reference mark 13 (FIG. 3) within an identical track.

Figure 5:
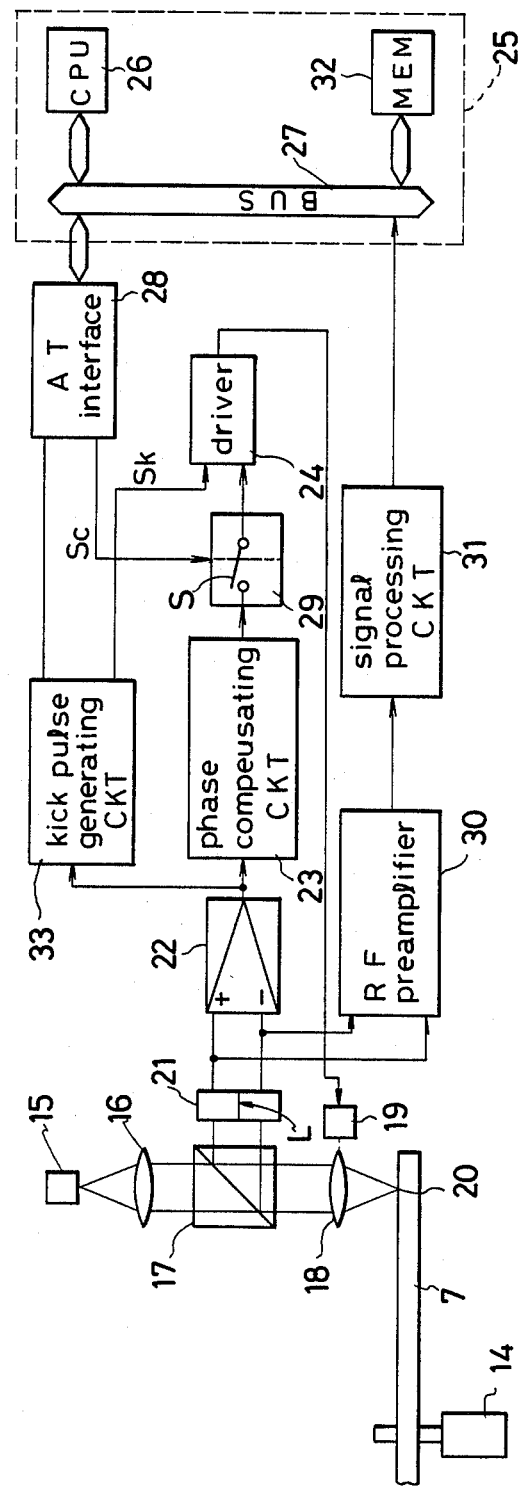
FIG. 5 is a schematic view showing the overall configuration of an optical disc recording/reproduction apparatus according to an embodiment of the present invention.

FIG. 5 is a schematic view showing the overall construction of an optical disc recording/reproduction apparatus according to an embodiment of the present invention.

Referrring to FIG. 5, the optical disc 7 having the structure of FIGS. 2 and 3 and the recording information format of FIG. 4 is driven by a drive motor 14. In the recording/reproducing apparatus shown in FIG. 5, tracking servo control of a so-called push-pull system is employed.

A laser beam emitted from a semiconductor laser source 15 is collimated by a collimator lens 16, and a collimated beam is transmitted through a beam splitter 17. The beam from the beam splitter 17 is focused by an objective lens 18 to form a beam spot 20 on a guide track on the optical disc 7. Reference numeral 19 denotes an actuator for performing tracking servo control by driving the objective lens 18.

A beam reflected by the optical disc 7 is separated by the beam splitter 17 away from the incident optical path and is incident on a two-split photosensor 21. A split direction, i.e., a split line L of the two-split photosensor 21 is parallel to the guide track on the disc.

When the beam spot 20 is properly formed on the guide track, a diffraction intensity at one end of the guide track groove is the same as that at the other end thereof. The light distribution on the light-receiving surface of the photosensor 21 becomes vertically symmetrical about the split line L. However, when the beam spot 20 is deviated from the guide track, the diffraction intensity at one end of the guide track groove becomes different from that at the other end thereof with respect to the split line L. Outputs from the two sensor elements of the photosensor 21 are differentially amplified by a differential amplifier 22 to obtain a tracking error signal $e_t$. This tracking error signal $e_t$ is phase-compensated by a phase compensating circuit 23 and is then amplified by a driver (drive circuit) 24 to a proper level through an analog switch 29. The amplified signal is used to drive the actuator 19, so that the objective lens 18 can be controlled with tracking servo control.

By virtue of one of the features of the optical disk recording/reproducing apparatus according to this embodiment, defective sector information is stored in a recording surface of the optical disc and in a memory of the disk controller by detecting the defective sectors in advance. The operation will be described when the defective sector information is stored.

When an unused optical disc is used, a tracking control ON signal $S_C$ is generated in response to a tracking control ON command from a central processing unit (CPU) 26 in a disc controller 25 through a common bus (BUS) 27 and an AT interface 28. A contact S of the analog switch 29 is closed in response to the tracking control ON signal $S_C$, thereby performing tracking control. In this case, an address access is performed while the sector on the optical disc is scanned with the laser beam.

Currents from the two-split photosensor 21 are converted by an RF preamplifier 30 to a voltage. This voltage is processed by a signal processing circuit 31. The processed signal is supplied to the disc controller 25. In this case, if a track jump caused by a defect on the optical disc has not occurred, the reproduced track address TA is the same for each concentric track. The sector address SA is incremented from the sector at a position corresponding to the reference mark 13. Therefore, when the track address TA or the sector address SA changes due to an abnormal state, the CPU sets the condition flag CF at logic "1" so as to forbid access to this sector, and stores the sector position data in a memory (MEM) 32.

After data from all the sectors are reproduced, the defective sector information stored in the memory 32 is stored in an appropriate position of the optical disc. This position is preferably selected in a vicinity of the initial access position of the optical disc so as to increase the access speed.

According to another feature of the recording/reproduction apparatus of the optical disc according to this embodiment, before the laser beam spot passes through a defective sector, it is detected in accordance with data stored in the memory 32. When the laser beam spot is about to pass through the defective sector, the laser beam spot is controlled to pass through a non-defective track adjacent to the track belonging to the defective sector. This operation will be described in detail.

When an optical disc having defective sector information is recorded or reproduced (reproduction operation is exemplified hereinafter), the information is reproduced and stored in the memory 32 in the disc controller 25.

Figure 6:
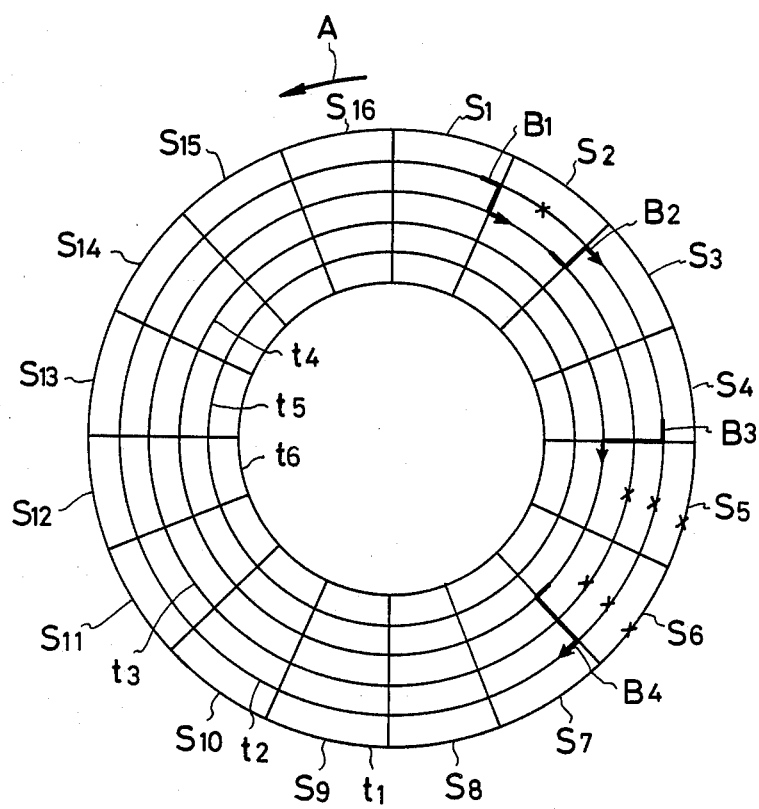
FIG. 6 is a plan view of an optical disc for explaining data access according to the method of the present invention.

FIG. 6 shows tracks $t_1$ to $t_6$ and sectors $S_1$ to $S_{16}$. A record position at a sector $S_m$ (m=1 to 16) for a track $t_n$ (n=1 to 6) is represented by a sector ($t_n$, $S_m$), Sectors with an X mark are defective sectors.

Assume that the laser spot is located in a sector ($t_2$, $S_1$), and that the disc is rotated at a constant angular velocity in a direction indicated by arrow A. The defective sector information on the optical disc is stored in the memory 32, and the CPU detects that a defect is present in the next sector ($t_2$, $S_2$) When information is completely reproduced from the sector ($t_2$, $S_1$), the laser spot is moved by a kicking means, as indicated by arrow $B_1$, so as to scan a sector ($t_3$, $S_2$). Immediately before access of the sector ($t_3$, $S_2$) is completed, the laser beam is moved, as indicated by arrow $B_2$, so that the laser beam spot returns to the track $t_2$, thereby accessing the sector ($t_2$, $S_3$). In this case, information from the sector ($t_3$, $S_2$) is not required, and the track $t_2$ is properly accessed. It is therefore preferred to start kicking within a short period of time immediately before reproduction of information from the sector ($t_3$, $S_2$) is completed in view of a kicking period. Similarly, a predetermined period of time is required for kicking along the direction indicated by arrow $B_1$, and the information of the sector ($t_3$, $S_2$) may be partially omitted. However, this information is not required, and no problem occurs. A known time counting means such as a timer or a counter may be used to count the time. Kicking is performed in response to a kick pulse $S_K$ from a kick pulse generating circuit 33 in accordance with a kick command from the CPU 26 shown in FIG. 5.

In the kick operation, the laser spot is scanned along the inner track. However, the laser spot may be moved along the outer track. In the above operation, one sector is defective, and any adjacent sectors are not defective, thus exemplifying the basic operation. However, when two adjacent sectors are defective, or a plurality (N) of sectors are successively defective, reproduction is performed for a period corresponding to the plurality (N) of sectors along the most adjacent track, as indicated by arrows B3 and B4.

Figure 7:
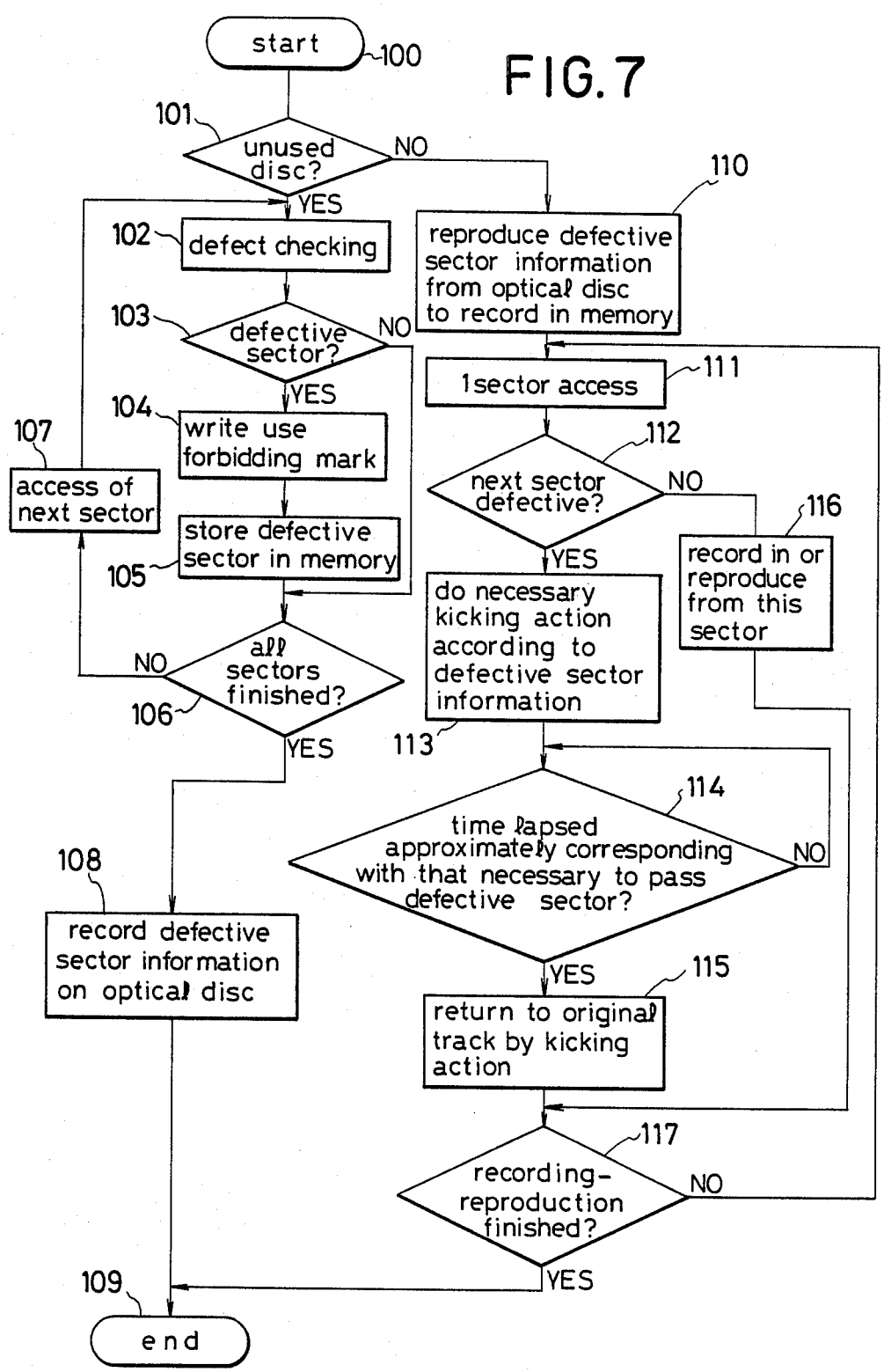
FIG. 7 is a flow chart for explaining the recording or reproduction operation of the present invention.

FIG. 7 is a flow chart for explaining the recording or reproduction operation of the optical disc according to the method of the present invention. The operation steps will be described with reference to FIG. 7.

Referring to FIG. 7, the operation is started in step 100. The CPU 26 checks in step 101 whether or not the optical disc is an unused disc, i.e., whether or not detection of defective sectors must be performed.

If YES in step 101, the flow advances to step 102. The defective sectors are checked in step 102. The CPU 26 checks in step 103 whether or not defective sectors are present. If YES in 103, a use forbidding mark of the corresponding sector is written in step 04. In step 105, defective sector information such as the sector address is stored in the memory. In step 106, the CPU 26 checks whether or not all the sectors have been subjected to defect check. If NO in step 106, the next sector is accessed in step 107. The flow then returns to step 102, and the defect check operation described above is repeated. However, if YES in step 106, the defective sector information stored in the memory is written in the optical disc in step 108. In step 109, the optical disc defect check for the nonused disc is completed.

For the optical disc wherein defective sectors are detected in the manner described above, recording or reproduction is started from step 100. Subsequently, information recording or reproduction is performed immediately after the defect check, and the flow jumps to step 101 after step 108. The operation can be performed in accordance with the defective sector information stored in the memory.

However, if NO in step 101, the flow advances to step 110. The defective sector information is read out from the optical disc and is written in the memory. Subsequently, in step 111, one-sector access is repeated. The CPU 26 checks in step 112 whether or not the next sector is a defective sector in accordance with storage contents of the memory.

If YES in step 112, the flow advances to step 113. In step 113, kicking is performed as needed in accordance with the defective sector information. The CPU 26 checks in step 114 whether or not a period of time required for causing the laser beam to pass through the defective sector has lapsed. If NO in step 114, the laser beam passes through a sector track adjacent to the defective sector track. When the CPU 26 detects that the predetermined time has lapsed, the flow advances to step 115, and reverse kicking is performed to return the laser beam to the original track. Flow then proceeds to step 117, described below. However, when the CPU 26 determines in step 112 that the next sector is not a defective sector, the flow advances to step 116. Information is accessed with respect to this sector in step 116, and the flow advances to step 117. In step 117, the CPU 26 checks whether or not recording or reproduction is completed. If NO in step 117, the flow returns to step 111, and the next sector is accessed. However, if YES in step 117, the flow advances to step 109, and the routine is ended.

In the embodiment described with reference to FIGS. 3 to 6, the track address TA and the sector address SA are used to detect the presence/absence of defects in each sector. However, a test signal may be recorded on the optical disc, and a defect may be detected in accordance with a degree of dropout when the test signal is reproduced. However, in this case, since the test signal is recorded in the optical disc, an optical disc whose recorded information can be deleted must be used.

According to the recording/reproduction method as described above, the push-pull method is used as a tracking servo control system shown in FIG. 5. However, the present invention is concerned with the optical disc access method and may employ any tracking control system. A known focusing system may be used to focus the laser beam. In the arrangement shown in FIG. 5, the portion concerning the focusing control is omitted.

Furthermore, in the control operation described above, the tracks are concentric, and the optical disc is rotated at a constant angular velocity. However, the present invention can be similarly applied to an optical disc having spiral tracks or a constant linear velocity without alteration of the effect of the embodiment described above.

In the above embodiment, the defective sector information is recorded on the optical disc. However, when information is recorded or reproduced immediately after the defective sectors are detected, the defective sector information need not always be recorded. In this case, when the optical disc is replaced in the same apparatus, defective sector detection must be performed for every replacement.

What is claimed is:

1. An apparatus for recording or reproducing information in or from an optical disc, comprising:
    means for carrying out at least one of recording and reproduction of information by scanning with a light beam the optical disc having a recording surface such that respective tracks are divided into a plurality of sectors, while carrying out tracking;
    detecting means for detecting a defective sector out of said plurality of sectors;
    memory means for storing position information of the defective sector detected by said detecting means; and
    controlling means for shifting said light beam from a position on a first track associated with the defective sector to a radially aligned position on another track near said first track immediately after the completion of scanning a sector next before said defective sector, in accordance with the position information of the defective sector which is stored in said memory means, and causing said light beam to scan a sector of said another track so that said light beam by-passes said defective sector.

2. An apparatus according to claim 1, further comprising means for recording the position information of the defective sectors in the optical disc.

3. An apparatus according to claim 1, wherein said detecting means comprises means for scanning the respective sectors with the light beam while tracking control is performed, means for reading out respective sector addresses, and means for detecting changes in the sector addresses.

4. An apparatus according to claim 1, wherein said memory means comprises a memory in a disc controller.

5. An apparatus according to claim 1, wherein said controlling means comprises a central processing unit in a disc controller, and a kick pulse generating circuit for supplying a kick pulse to said recording or reproducing means in accordance with a command from said central processing unit.

6. A method for recording or reproducing information only in a sector without any defect of an optical disc having a recording surface obtained such that respective tracks are divided into a plurality of sectors, comprising:
    scanning the optical disc with a light beam while carrying out tracking to detect a defective sector;
    judging that the light beam has come immediately before the defective sector in accordance with position information of the detected defective sector; and
    shifting the light beam from a position on a first track associated with the defective sector to a radially aligned position of another track after said judging step, and causing said light beam to scan a sector of said another track so that said light beam bypasses said defective sector.

7. A method according to claim 6, wherein the defective sector is detected while the respective sectors on the optical disc are scanned with the light beam in accordance with tracking control so as to detect a track jump caused by a defect.

8. A method according to claim 6, wherein the position information of the defective sectors is recorded in the optical disc and is reproduced from the optical disc prior to recording or reproduction.

9. A method according to claim 6, further comprising a step of returning the light beam to the track associated with the defective sector after the light beam has scanned said another track.

* * * * *

UNITED STATES PATENT AND TRADEMARK OFFICE
CERTIFICATE OF CORRECTION

PATENT NO. : 4,821,251

DATED : April 11, 1989

INVENTOR(S) : HIDEKI HOSOYA

It is certified that error appears in the above-identified patent and that said Letters Patent is hereby corrected as shown below:

IN THE DRAWING, SHEET 4
 FIG. 5, Block 23, "compeusating" should read --compensating--.

COLUMN 3

Line 10, "a" should read --an--.

COLUMN 5

Line 38, "$(t_2, S_2)$" should read --$(t_2, S_2)$.--.

COLUMN 6

Line 15, "step 04." should read --step 104.--.

COLUMN 8

Line 2, "by-passes" should read --bypasses--.

Signed and Sealed this

Sixth Day of March, 1990

*Attest:*

JEFFREY M. SAMUELS

*Attesting Officer*     Acting Commissioner of Patents and Trademarks